(12) United States Patent
Wolber et al.

(10) Patent No.: US 7,590,640 B2
(45) Date of Patent: Sep. 15, 2009

(54) SYSTEMS AND METHODS FOR MANAGING THE FLOW OF ATTACHMENTS TO BUSINESS OBJECTS

(75) Inventors: Andreas Wolber, Heidelberg (DE); Johannes Bechtold, Muhlhausen (DE); Olaf Babel, Bruchsalestr (DE); Tim Back, Manheim (DE); Klaus Wriessnegger, Walldorf (DE); Philipp Steves, St. Leon-Rot (DE)

(73) Assignee: SAP AG, Walldorf (DE)

( * ) Notice: Subject to any disclaimer, the term of this patent is extended or adjusted under 35 U.S.C. 154(b) by 333 days.

(21) Appl. No.: 11/320,692

(22) Filed: Dec. 30, 2005

(65) Prior Publication Data

US 2007/0162467 A1    Jul. 12, 2007

(51) Int. Cl.
*G06F 17/30* (2006.01)
(52) U.S. Cl. ...................................... 707/100
(58) Field of Classification Search ............. 707/2, 707/101, 104.1, 100; 709/224, 201
See application file for complete search history.

(56) References Cited

U.S. PATENT DOCUMENTS

| 6,732,111 | B2 * | 5/2004 | Brodersen et al. | 707/101 |
| 2003/0144852 | A1 * | 7/2003 | Eckert et al. | 705/1 |
| 2004/0184060 | A1 * | 9/2004 | Nathan | 358/1.13 |
| 2004/0205622 | A1 * | 10/2004 | Jones et al. | 715/523 |
| 2005/0102348 | A1 * | 5/2005 | Parsons et al. | 709/201 |

\* cited by examiner

*Primary Examiner*—Etienne P LeRoux
(74) *Attorney, Agent, or Firm*—Finnegan, Henderson, Farabow, Garrett & Dunner, LLP

(57) ABSTRACT

Systems and methods are disclosed for managing the flow of documents. A first business object may have a file associated therewith. A second business object may be associated with the first business object. It may be determined whether the file associated with the first business object is relevant to the second business object. If the file is determined to be relevant to the second business object, the system may be operative to associate the file with the second business object.

20 Claims, 9 Drawing Sheets

FIG. 1
PRIOR ART

| DOCUMENT SANS NOM - MICROSOFT INTERNET EXPLORER PROVIDED BY SAP IT | | | | | | | |
|---|---|---|---|---|---|---|---|
| PURCHASE ORDER: 54954843 | | | | | BACK | FORWARD | |
| SUPPLIER HONEYBAD, DETROIT TOTAL VALUE $1906 STATUS NEW | | | | | | | |
| [SEND] [CHECK] [SAVE] [PRINT] | | | | | | | |

SEARCH FOR: [ALL ▼]

[GO]

ADVANCED OPTIONS

HEADER DATE

ITEMS

ITEM DETAILS

NOTES AND ATTACHMENTS

ATTACHMENT SERVICES

VIEW BY: [DEFAULT ▼] | [DISPLAY] [EDIT] [DELETE] [PROPERTIES] [VERSION] | [RENAME] | [CREATE] [DOWNLOAD] [NEW UPLOAD]

ATTACHMENT LIST 404 / 402

| | NAME | DOCUMENT TYPE | CREATED BY | SIZE | STATUS | LAST MODIFY | VERSION | FOLDER |
|---|---|---|---|---|---|---|---|---|
| ☐ | ▢ PURCHASE_ORDER_4390001412 | ▷ | ▷ | | | | | |
| ☐ | ▢ PURCHASE_ORDER_4390001413 | ▷ | ▷ | | | | | |
| ☐ | ▢ PURCHASE_ORDER_4390001414 | ▷ | ▷ | | | | | |
| ☐ | 📄 MYTABLE.XLS | SPECIFICATION | PIGNAL | 64 KB | FINAL ▷ | 06/05/2004 | 04 | |
| ☐ | 📄 TEXT.DOC | INSTALLATION DOC | CHRISTELLE | 10 KB | FINAL ▷ | 06/07/2004 | 02 | |
| ☐ | 📄 PICTURE.GIF | SUCCESS | TURCI | 120 KB | DRAFT ▷ | 10/11/2004 | 11 | |
| ☐ | 📄 WWW.GOOGLE.FR | LINK | DE GIBON | | FINAL ▷ | 06/07/2004 | 01 | HTTP:// |
| ☐ | | | | | | | | |
| ☐ | | | | | | | | |

406 406 406 408

HISTORY

PREVIEW

YOU CAN ALSO

MAINTAIN DEFAULT PARAMETER
SAVE AS TEMPLATE
EVALUATE SUPPLIER

RELATED DOCUMENTS

UNDERLYING CONTRACT
PURCHASE REQUEST
SUPPLIER EVALUATION

*FIG. 4*

SYSTEMS AND METHODS FOR MANAGING THE FLOW OF ATTACHMENTS TO BUSINESS OBJECTS

BACKGROUND

I. Technical Field

The present invention relates generally to the storage of documents within an electronic document management system. More particularly, the present invention relates to managing the flow of attachments to business objects.

II. Background Information

Unstructured content created using computer applications is often stored as a file, or document, in an electronic document management system. Commonly, documents are classified within the document management system according to semantic document types. In certain document management systems known in the art, document types may be configured freely by-a document management system administrator. The document type configuration can describe both technical properties of the document, such as the computer application with which the document can be viewed or edited, and semantic properties, such as classifying the document as a "product specification," a "product picture" or a "customer note." Other document attributes that are often controlled by document type include (i) the changeability of a document (e.g. read-only or writable); (ii) default security settings; (iii) the lifetime of the document; and/or (iv) workflow and status management rules to be applied.

Business objects stored in business application software, such as Enterprise Resource Planning, Customer Relationship Management and Supply Chain Management, are available from SAP AG, Walldorf, Germany. FIG. 1 depicts an exemplary business object 102. A particular business object may relate to a certain function or event, such as a "Sales Order" or a "Pending Delivery." Each business object may have an associated folder, or "attachment container." The attachment container may serve as a collection object for all documents attached to one business object. The attachment container may be an object directly integrated into an application business object model in a "composition" relationship. The attachment container object may "live" in the application system containing its associated business object. Thus, the lifecycle of the attachment container may be completely under the control of the host business object. The attachments "contained" in the attachment container may be standalone objects referenced by the attachment container, and need not be stored in the application system. For example, the attachments may be stored in an external document management system.

Attachment containers may be accessible from their associated business objects, such as by engaging a link 104 as shown in FIG. 1. FIG. 2 depicts a business object 202 associated with an attachment container 204. Attachment container 204 may contain one or more files 206 associated with business object 202. Attachment container 204 may comprise one or more collections 208, in which files 206 may be stored. The use of attachment containers is commercially known in products such as the mySAP Business Suite, available from SAP AG, Walldorf, Germany.

However, while attachment containers of the type described above may be useful in associating particular documents with a business object, it is often desirable to associate a particular document with multiple business objects. However, applications do not understand the content of attachments, and instead operate only on high-level entities like "document types." Accordingly, applications do not recognize when an attachment to one business object would advantageously be associated with another business object, as well. For example, oftentimes a source business object, such as a "Sales Order," will give rise to follow-up business objects, such as a "Pending Delivery." In such cases, it may be beneficial to associate certain documents stored in the attachment container for the "Sales Order" business object with the "Pending Delivery" business object. For instance, a "customer note" document containing special instructions from a customer may be relevant to the "Sales Order" business object to ensure that the instructions are carried out, and may also be relevant to the "Pending Delivery" business object so that a final check of the special requirements may be performed. In the document management systems of the prior art, it is necessary to separately insert a document such as the "customer note" document in the attachment container of each business object with which the user desires to associate the document.

The failure of the current art to provide a technique for determining whether a newly created attachment to a business object should also be associated with another related business object, or to associate attachments of a source business object with a newly created follow-up business object, leads to extra work for users, and may result in information failing to reach those who would benefit from it. The current art is also deficient in that it is often difficult to transfer attachments between application systems, meaning that data must be entered separately in each system, leading to inconsistencies in the data available to users at different points along the business process.

SUMMARY

Consistent with the principles of the present invention, systems and methods are disclosed for managing document flow in a document management system.

In one aspect, a method for managing the flow of documents may comprise associating a file with a first business object. The method may also comprise associating a second business object with the first business object. The method may comprise determining whether the file is relevant to the second business object and, if so, associating the file with the second business object.

In another aspect, a system for managing the flow of documents may comprise a first business object. The system may further comprise a second business object associated with the first business object. The system may comprise a file associated with the first business object. The system may be operative to determine if the file is relevant to the second business object. The system may further be operative, if the file is determined to be relevant, to associate the file with the second business object.

In yet another aspect, a computer-readable medium may comprise instructions, the execution of which may cause a computer to perform a method comprising associating a file with a first business object. The method may also comprise associating a second business object with the first business object. The method may further comprise determining whether the file associated with the first business object is relevant to the second business object and, if so, associating the file with the second business object.

It is to be understood that both the foregoing general description and the following detailed description are exemplary and explanatory only and are not restrictive of the invention as claimed. The foregoing background and summary are not intended to provide any independent limitations on the claimed invention.

BRIEF DESCRIPTION OF THE DRAWINGS

The accompanying drawings, which are incorporated in and constitute a part of this disclosure, illustrate various embodiments and aspects of the present invention. In the drawings:

Figure 1:
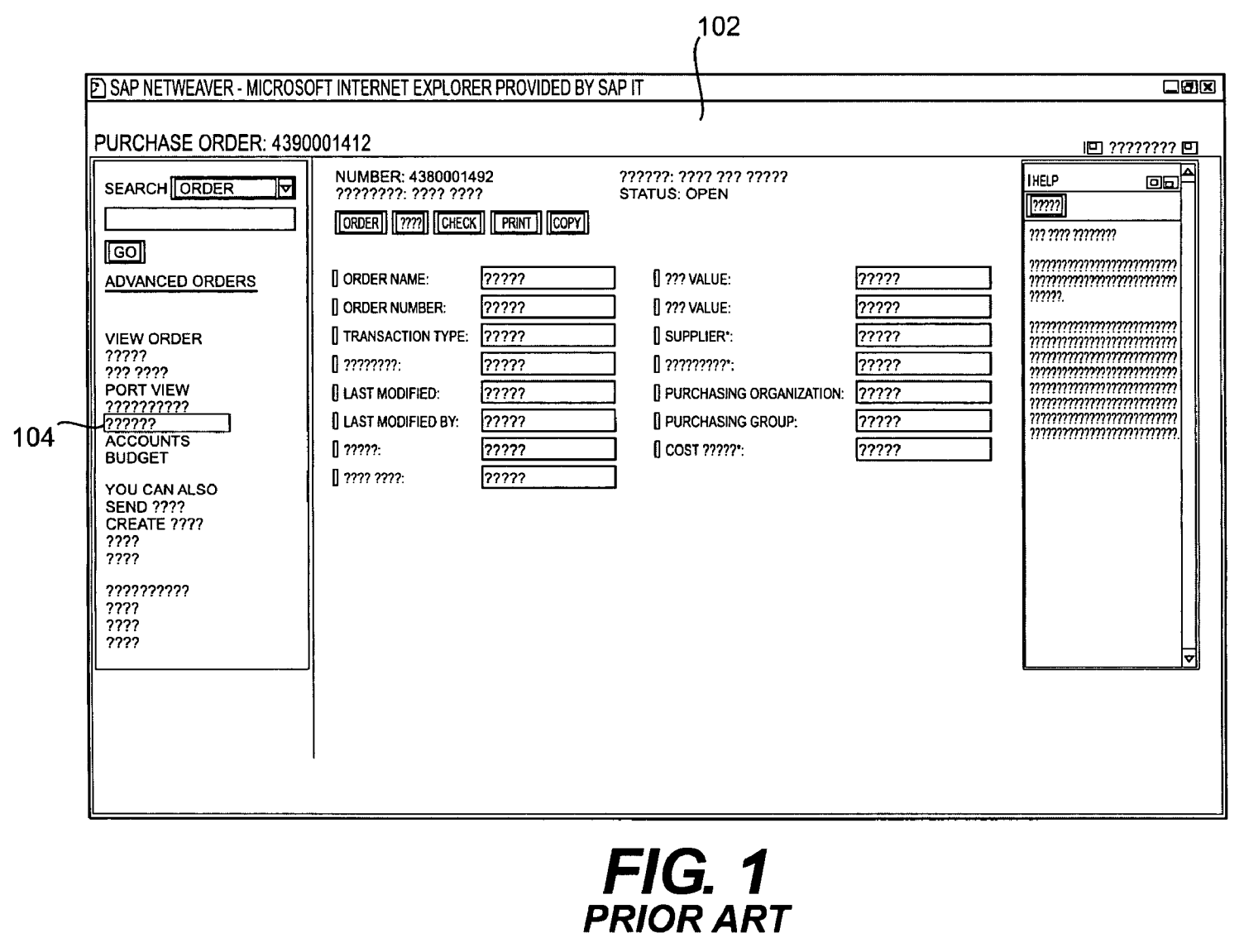

FIG. 1 is a structure of an exemplary business object as known in the art.

FIG. 4 illustrates an exemplary attachment container consistent with the principles of the present invention.

DETAILED DESCRIPTION

Figure 2:
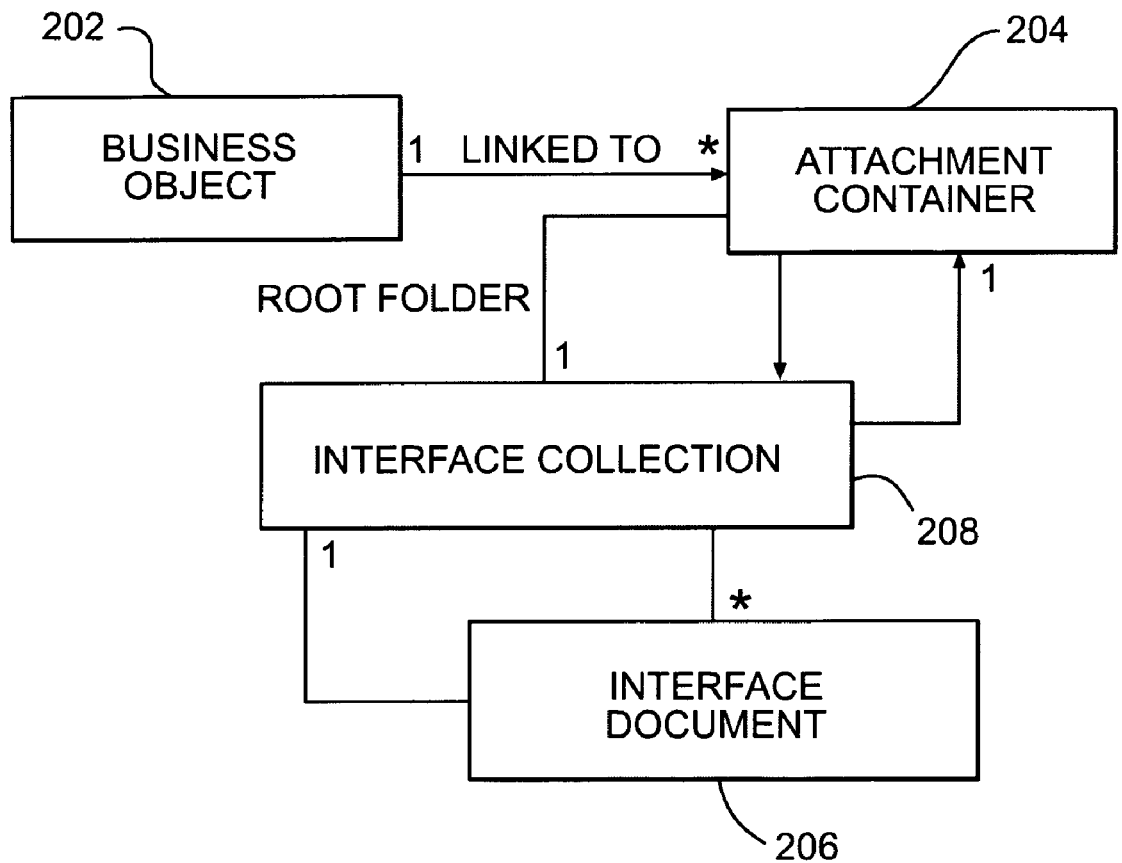
FIG. 2 is a diagram illustrating the relationship between a business object and an attachment container as known in the art.

The following detailed description refers to the accompanying drawings. Wherever possible, the same reference numbers are used in the drawings and the following description to refer to the same or similar parts. While several exemplary versions and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

A document management system consistent with the present invention may be used to store unstructured content in documents (e.g., files). The document management system may include a "document model" through which a system administrator may create various "document types." In one version, the administrator may freely associate varying technical and semantic properties with the different document types to govern the handling of the document type within the document management system. Each document contained within the document management system may be classified as one of the document types modeled by the administrator. Thus, every document of a particular document type may comprise the properties associated with that document type. In this manner, unstructured content (e.g., documents) may be classified within a business context to control the treatment of the document within the document management system.

Document properties conferred on a document by the document type configurations may include, but are not limited to, the following: (i) defining the role of the document within a business process so that documents can be identified to users associated with that role; (ii) categorizing documents of that type within a certain subset of documents (e.g. to enable an automatic retrieval program to distinguish between categories of documents); (iii) applying access policies (i.e. read-only rules, prohibition of deletion, linking, versioning, etc); (iv) attaching special services and actions to documents of that type; or (v) attaching a set of templates to documents of that type. It is understood that the properties described above are exemplary only, and that the document model may be used to assign other or additional properties in creating document types.

As known in the art, "business objects" associated with various business application software may be provided. A business object may represent a business function (as opposed to a system function), such as a person, event, function or business process. Typical examples of business objects include "Customer," "Invoice," "Sales Order," and "Account." For example, a business object may be a particular "Sales Order." A business object may have relationships with other business objects, and may be used in combination to perform a certain task.

It is often desirable to associate documents related to a particular business object with that business object, such that users of the business object also have access to the related documents. This may be accomplished by grouping files related to a particular business object in a common location so that a person or application working with the business object may readily find all information associated with that business object. Accordingly, in one aspect consistent with the present invention, each business object may be associated with a folder, or "attachment container," in which documents related to the respective business objects may be stored. Continuing with the example given above, the attachment container associated with a "Sales Order" business object may include documents relating to that sales order, such as a "product specification," a "product picture" or "customer notes." It is recognized that a business object and its associated attachment container need not be stored within the same system as the files referenced by the attachment container. For example, a business object and its attachment container may be located in business application software, such as an EPR, CRM or SCM system, while the files "attached" to the business object via the attachment container may be stored in a local or centralized document management system.

Figure 3:
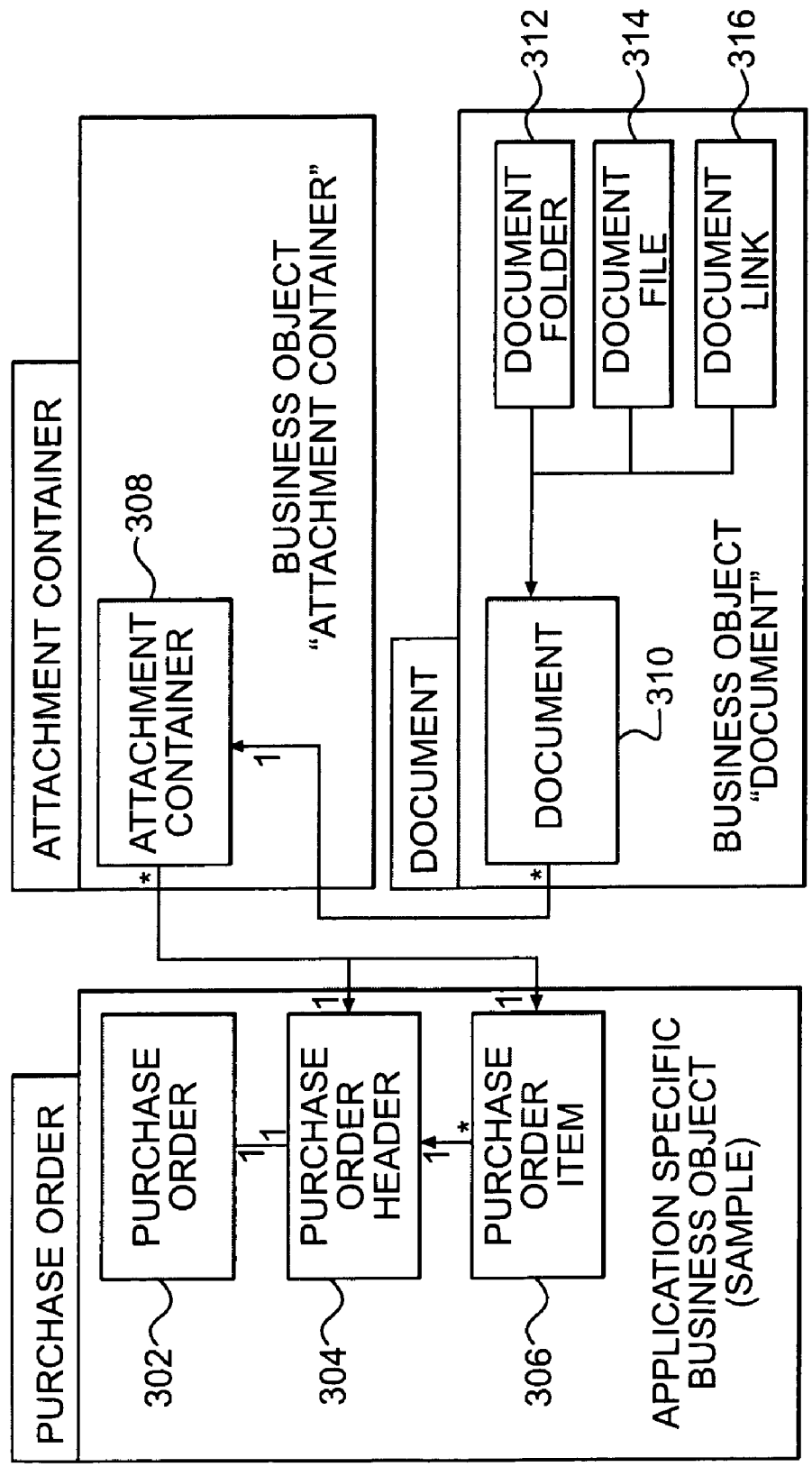
FIG. 3 is a diagram illustrating an exemplary relationship between a business object and an attachment container consistent with the principles of the present invention.

Consistent with the principles of the present invention, relations between business objects and attachment containers may be established at nodes of the business objects. Because various components of a business object may comprise a node, a single business object may be associated with more than one attachment container. FIG. 3 is an illustration of an exemplary relationship between a business object 302 and an attachment container. Business object 302 may comprise a header component 304 and one or more item components 306. Header component 304 and the one or more item components 306 may comprise a business object node. Accordingly, both header component 304 and item component 306 may be associated with a single attachment container 308. As pictured in FIG. 3, attachment container 308 may include a document 310 attached to business object 302. Attachment container 308 may be adapted to include a variety of object types, including without limitation one or more folders 312, files 314 or links 316.

Often, business objects are not isolated entities, but are related to other business objects in the same system or in external systems. For instance, a source business object "Sales Order" may give rise to the follow-up business object "Pending Delivery." Given the related nature of the two business objects, it is likely that certain documents attached to one business object may be relevant to the second business object.

Consistent with the principles of the present invention, it may be possible for a document stored within the attachment container of one business object to be associated with the attachment container of another business object. In one aspect, the system may comprise an "attachment flow engine" operative to apply one or more attachment flow rules formulated by an administrator to determine whether the attachment container of a secondary business object should include links to or copies of the attachments of a primary business object. This may be accomplished, in one version, by applying an attribute to a business object to relate it to one or more existing business objects. The business object may also be assigned an attribute that governs which document types the business object is authorized to receive. The system may be operative to determine, based on the attributes of attachments and business objects, which attachments of a business object should be associated with other related business objects.

If the system determines that an attachment to a first business object should be associated with a second business object, the system may be operative to associate the attachment with the second business object. In one aspect, the system may be operative to place a copy of the attachment in the related business object's attachment container. In other aspects, the system may place a link to the attachment in the related business object's attachment container.

The system may be operative to manage attachment flow for both newly created business objects and attachments. For example, when a document is attached to the first business object, the system may be operative to determine whether that attachment should be associated with an existing business object.

Similarly, when a new business object is created, the system may determine whether attachments to other business objects should be associated with the new business object. For example, a user desiring to create a "purchase order" business object as a follow-up to a "purchase request" business object may open the pre-existing "purchase request" business object and engage a feature to create a related business object. In this manner, the system may be notified that the "purchase order" business object is related to the "purchase request" business object and may determine whether any attachments to the "purchase request" business object are relevant to the "purchase order" business object. The user may also manually associate one business object with another. For example, when creating a "purchase request" business object for a particular product, the user may associate an identifying attribute, such as the product's identification number, with the business object, prompting the system to determine whether any attachments to the "product" business object are relevant to the newly created "purchase request" business object.

In one version consistent with the principles of the present invention, a user creating a business object may manually associate a particular attachment or document type of another business object that is not automatically associated with the newly created business object by the system. Likewise, a user may be allowed to manually override the system to disassociate an attachment from a related secondary business object. In one aspect, a special user interface may be provided to display all relevant attachments of a source business object when creating a follow-up business object. The user interface may allow the user to select any attachments that he desires to include or exclude from the attachment container of the follow-up business object. The system may include security features preventing a non-administrator from attaching confidential attachments to a business object that may be disseminated to unauthorized users.

As mentioned above, attachments to one business object may be associated with a secondary business object via a link placed in the attachment container of the secondary business object. In one aspect, links located in the attachment container of a secondary business object may be bidirectional. Thus, the system may be operative to notify a user of a primary business object that a secondary business object has referenced the primary business object's attachments. Bidirectional linking may also assist in verifying the authority of an individual or application to access the attachment and the primary business object. In one aspect, the system may verify the user's permission to access both the secondary business object that he is linking from as well as his permission to access the primary business object and its attachment.

In one version, a link to the original document may be provided in order to prevent creation of numerous copies of the original document among various secondary business objects, each of which may be separately edited. Providing a link, as opposed to a copy, may be desirable in certain applications in order to avoid creating numerous versions of a document throughout the system in which the attachments are stored. Even a "read-only" copy would invite discrepancies because the original document could be revised after copies associated with related business objects, and those revisions would not be transmitted to the secondary business objects. Thus, by maintaining a single "master" document linked to secondary business objects, any edits made to the original master document will be viewed by users of the secondary business object linking to the master document attached to the primary business object.

Alternatively, as discussed above, in another aspect, an attachment to a primary business object may be associated with a secondary business object by placing a copy of the original attachment in the attachment container of the secondary business object. It may be desirable in certain circumstances for a user of a secondary business object to have the ability to edit a document originally attached to a primary business object without altering the original document. Accordingly, a system operative to place a copy of an attachment of a primary business object in the secondary business object's attachment container allows a user of the secondary business object to make alterations to the copy without altering the original document.

FIG. 4 illustrates an exemplary attachment container 402. Attachment container 402 may comprise a number of folders, or collections, 404. Attachment container 402 may also comprise one or more files 406 and/or links 408. As shown in FIG. 4, attachment container 402 may include information (e.g., "document type") notifying users whether each object stored in attachment container 402 is a file 406 or a link 408.

Like a common file or document, a business object may have technical and semantic properties associated therewith that govern the business object's relation to other business objects for attachment flow purposes. In one version consistent with the present invention, the administrator may control which document types may be stored within the attachment container of each business object. In another aspect, the creator of a business object may select a property that determines what document types may be associated with that business object. For example, when creating a "Supplier Order" business object that is related to a previously created "Product Line" business object, the user may apply a property or attribute to the "Supplier Order" business object that authorizes it to receive certain types of attachments of the "Product Line" business object that pertain to the information needed by the supplier to fill the order, while preventing the "Supplier Order" business object from receiving attachments that contain confidential information not required by the supplier. A user may also manually select certain document types to be associated with the attachment container of a business object.

The document model may also allow for varying security standards to be applied to documents and business objects. An attachment to a business object may be given by default the same security setting as its associated business object. In one version consistent with the principles of the present invention, however, it may be possible to alter the default security settings, such that a user having access to a particular business object may not have access to all of the document types attached thereto. This may be desirable, for example, in the context of a Purchase Order business object. While the "Purchase Order" itself may be accessible to an external supplier filling the order, some attachments to the "Purchase Order" may include confidential internal information that should not be disclosed to the external supplier. In such a case, applying a higher security standard to the internal attachment than to the business object may be desirable. Conversely, it may also be desirable to apply a lower security setting to a document than is applied to the business object to which it is attached. For example, certain attachments to a "Product Master Data" business object, such as a "Product Specifications," may be published to a product catalog. Although the "Product Master Data" business object may contain confidential information and therefore have a relatively high security setting, it may be desirable to apply a lower security setting to the publicly available information contained in the "Product Specifications" attachment.

Consistent with the principles of the present invention, the system may be operative to perform security checks before associating an attachment of one business object with the attachment container of a related business object. For example, the system may be operative to determine whether the related business object is authorized to receive documents of the attachment's type. The system may also be operative to determine whether the security setting of the attachment is higher than the security setting of the related business object. If so, the system may be operative to block the association of the attachment with the related business object, or, alternatively, may be operative to prevent users from accessing the attachment unless they have a security clearance corresponding to the security setting of the attachment. The attachment framework may also be operative to perform integrated security handling between the system in which the attachments are stored and the application system in which the business object is stored. For example, the system may be operative to intercept security authorization checks for a business-object attachment stored on a document management system and delegate the check to the application business object.

It is recognized that in certain embodiments consistent with the principles of the present invention, the flow of attachments between business objects may not be restricted to flow within a single application system, but may extend across system boundaries. In one version, the system may work in conjunction with a distributed object management system (DOMS) to transfer documents between diverse applications and systems. In another version, the system may be integrated with a message-oriented middleware system, such as SAP XI, available from SAP AG, Walldorf, Germany, to allow document types of one platform to be distributed over multiple heterogeneous platforms.

The system may also be integrated with an output management system to automatically determine whether attachments to a business object should be attached to output including that business object. For example, in one version, uniform resource locators (URLs) for each attachment of an authorized document type may be included in internal communications of that business object, such as by a message-oriented middleware system, to users who can access the document management system. In another embodiment, for external communications (i.e. emailing or XI messaging) of business objects to outside users who cannot access the document management system, such as external customers or suppliers, the system may be operative to transmit the content and/or meta-information of relevant, authorized attachments with the business object. Similarly, the document management system may be operative to automatically print attachments of certain document types along with their associated business object.

Whether attachments to a primary business object are associated with secondary business objects or included in the output of the primary business object as links, copies, URLs, raw content or meta-information may in one embodiment be determined by the system. In certain versions, the system may make the determination of the manner of association or communication based on customer-specific or application-specific extension functions. For example, the system may determine that a recipient of a business object does not have access to the document management system to view a link or URL to an attachment to the communicated business object, and may therefore attach a copy of the document. Similarly, the system may determine that a recipient does not have authority to edit the original document and may therefore include a link to or URL of the original document.

Consistent with the principles of the present invention, the system may be operative to manage lifecycle integration of files associated with an application business object. If a business object is deleted from its application system, the attachment container may also be automatically deleted, as it may exist in a composition relationship with the business object. The system may forward the "delete" message to the document management system where the attachments to the business object are stored, prompting the document management system to delete the attachments. Similarly, if a business object is archived into an external archive store, such as a WebDAV server or an optical archive, the system may transfer the business object's attachments from their current location to the archive location.

In one version, a system consistent with the present invention may comprise a search engine capable of performing a free-text search of documents and business objects contained in the document management system. The document management system may display all documents matching the search query. The results may identify the business object corresponding to each document matching the search query. In that manner, the user may locate not only the documents matching the free-text search query, but also the associated business object and all of its attachments. The search engine may further be operative to allow the user to limit the search to selected types of business objects or to sort the search results by the business objects corresponding to the documents located by the search query to more efficiently target the desired information. In one version, the document management system may comprise a search engine that may perform search queries based on certain properties associated with documents contained in the document management system. In one aspect, only documents that are accessible under the user's permission setting are displayed in the results of a search query. In one embodiment, it may be possible to include full-text queries, document property values and business-object attributes into a single search.

An example of an embodiment of a system for managing the flow of documents consistent with the present invention may be described in terms of a business object titled "Product Master Data" and its associated attachment container. The "Product Master Data" business object, by its assigned properties, may be capable of receiving a variety of document types, which may include "product specifications," "product images," and "competitor information." A user maintaining the "Product Master Data" business object may save unstructured data relating to that business object as a file of a document type authorized to be stored in the business object's attachment container. By selecting which of the authorized business types to associate with the file, the user may control the document management system's handling of the document, such as the visibility of the attachment to different user groups, read-only characteristics, and versioning features.

When creating a new "Purchase Order" business object for the product associated with the "Product Master Data" business object, the user may define the new business object's properties to include a reference to the "Product Master Data" business object. The user may also select another property that defines the type of business object being created and/or the document types that may be associated with it. Based on this, and possibly other, information, the system may apply one or more rules created by the administrator to determine which of the attachments to the "Product Master Data" business object should be included in the attachment container of the "Purchase Order" business object. As discussed above, the referenced attachments may be included in the "Purchase Order" business object's attachment container as copies, links, URLs, raw content/meta-information, or any other format that allows a user of the "Purchase Order" business object to access the information referenced from the "Product Master Data" business object. If the creator of the "Purchase Order" business object desires to include attachments to another business object in the "Purchase Order" objects' attachment container that are not automatically included by the system, the creator may manually add documents to the "Purchase Order" attachment container. The creator may choose whether to add a link or copy, or some other type of reference to the document.

Continuing with the "Master Product Data" example, a call center agent may receive a telephone inquiry from a potential customer who does not recall the name of the product in which she is interested, but does remember the slogan associated with the product. The system may allow the call center agent to perform a full-text search of the document management system and may display a list of documents that include that slogan on the agent's computer monitor. In addition to the names of matching documents, the results may also include the business object associated with each of the matching documents. In order to search more efficiently, the system may allow the call center agent to restrict his search to certain business objects, such as "Product Master Data," or to sort the results based on the business objects associated with the matching documents.

Figure 5:
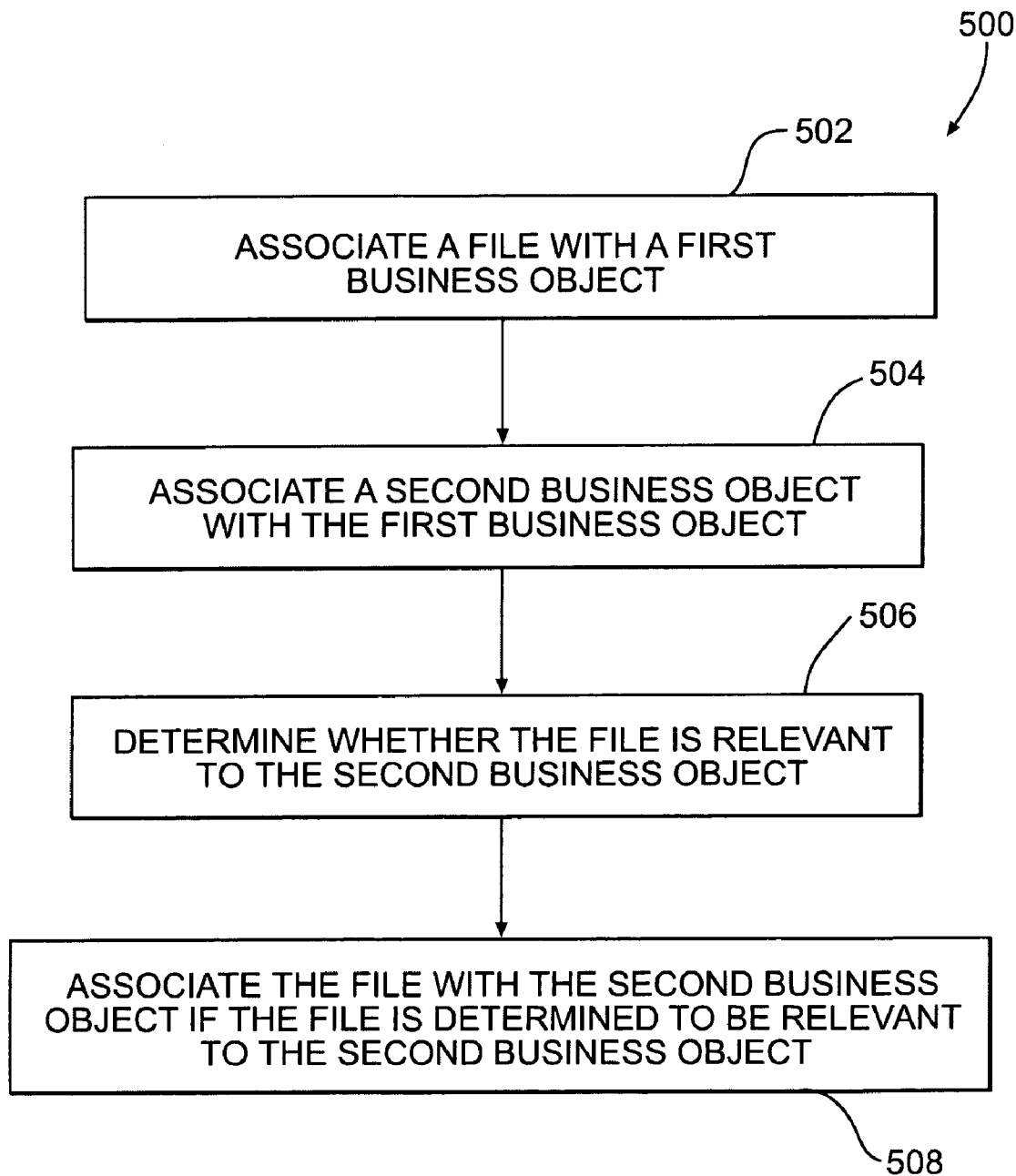
FIG. 5 illustrates the operation of an exemplary system consistent with the principles of the present invention.

FIG. 5 illustrates the operation of an exemplary system 500 consistent with the principles of the present invention. System 500 may associate a file with a first business object (502). System 500 may associate a second business object with the first business object (504). System 500 may apply determine whether the file is relevant to the second business object (506). If the file is determined to be relevant to the second business object, system 500 may associate the file with the second business object (508).

Figure 6:
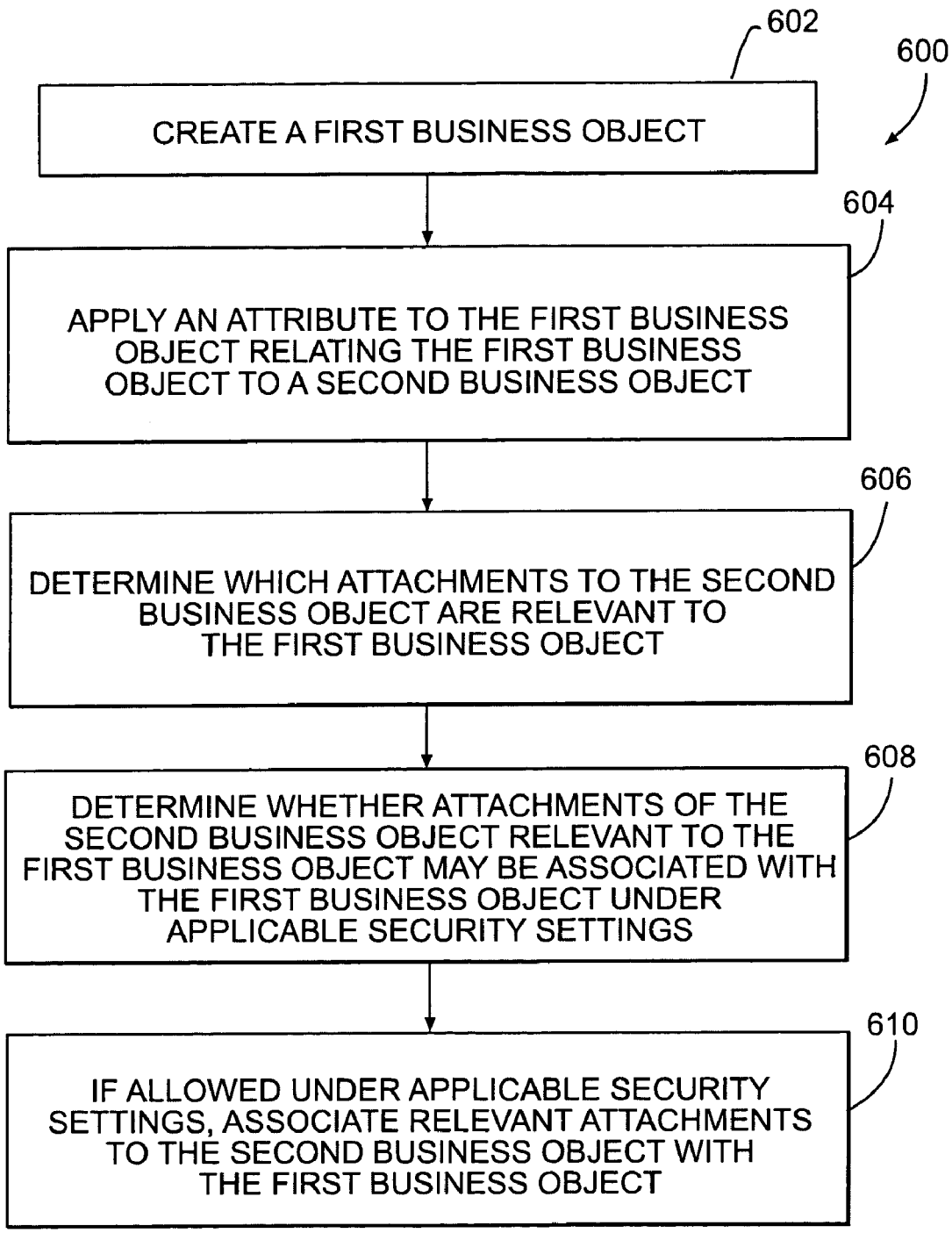
FIG. 6 illustrates the operation of an exemplary system consistent with the principles of the present invention.

FIG. 6 illustrates the operation of an exemplary system 600 upon creation of a first business object (602). System 600 may apply an attribute to the first business object relating the first business object to a second business object (604). System 600 may determine which attachments to the second business object are relevant to the first business object (606). System 600 may determine whether attachments of the second business object relevant to the first business object are allowed to be associated with the first business object under applicable security settings (608). If allowed under applicable security settings, system 600 may associate relevant attachments to the second business object with the first business object (610), such as by placing a link to the file or a copy of the file in an attachment container of the first business object.

Figure 7:
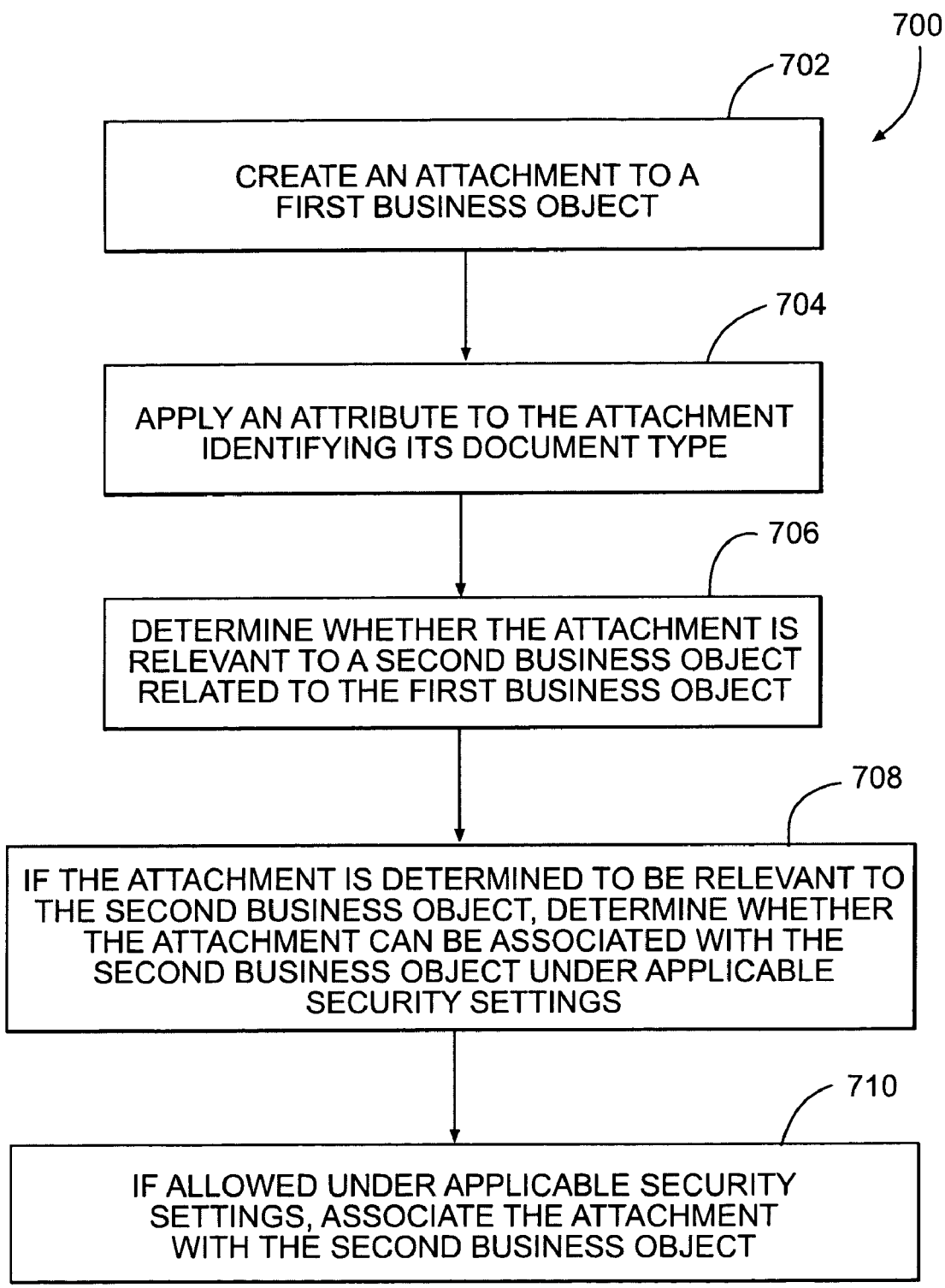
FIG. 7 illustrates the operation of an exemplary system consistent with the principles of the present invention.

FIG. 7 illustrates the operation of an exemplary system 700 upon creating an attachment to a first business object (702). System 700 may apply an attribute to the attachment identifying its document type (704). System 700 may determine whether the attachment is relevant to a second business object related to the first business object (706). If the attachment is determined to be relevant to the second business object, system 700 may determine whether the attachment may be associated with the second business object under applicable security settings (708). If allowed under applicable security settings, system 700 may associate the attachment with the second business object (710), such as by placing a link to the attachment or a copy of the attachment in an attachment container of the second business object.

A computer system may be used to install software applications implementing systems and/or methods managing the flow of attachments in a document management system. The computer system may be a computer network, as shown in FIG. 8, or a stand-alone personal computer (PC), as shown in FIG. 9.

Figure 8:
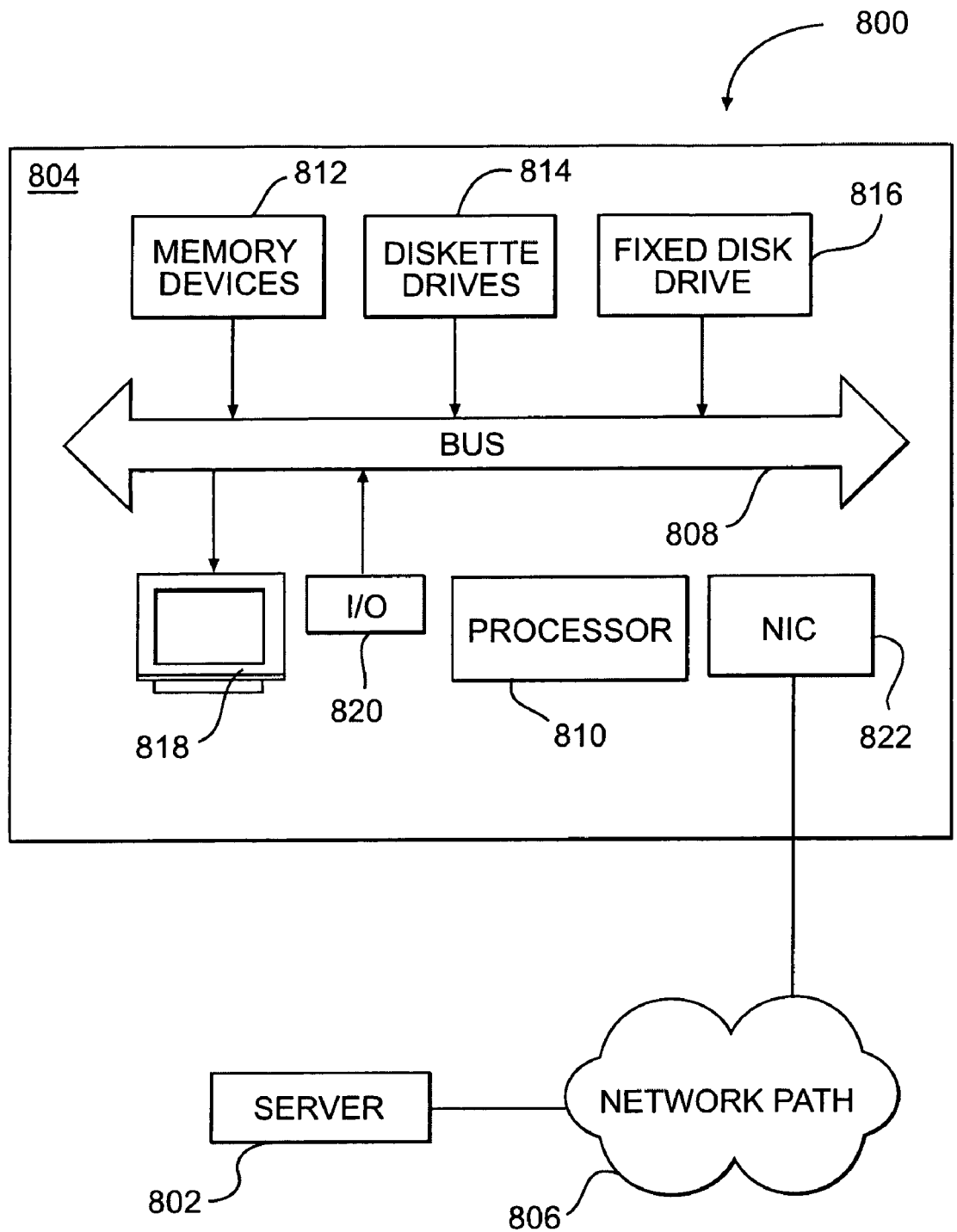
FIG. 8 illustrates a computer system for implementing a software application consistent with an embodiment of the present invention.
Figure 9:
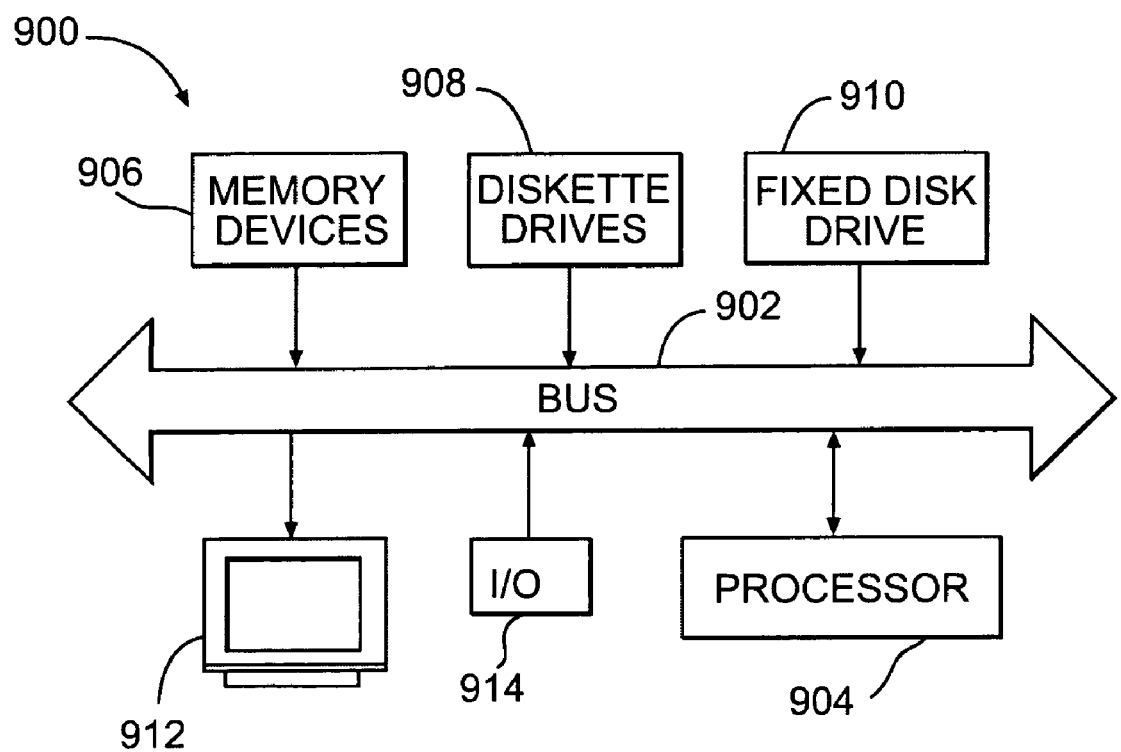
FIG. 9 illustrates another computer system for implementing a software application consistent with an embodiment of the present invention.

As shown in FIG. 8, a computer network 800 for implementing a data-entry user interface consistent with an embodiment of the present invention may include a server 802 and a stand-alone PC 804 connected through a network path 806. Computer network 800 may be a local area network (LAN), where server 802 and PC 804 are workstations. Computer network 800 may also be the Internet, with server 802 hosting a document management system and PC 804 being any workstation available to an individual desiring to interface with a document management system on server 802. Alternatively, computer network 800 may be a wide area network (WAN), and server 802 and PC 804 may lie in two separate LANs connected through the Internet.

PC 804 may include a bus line 808 connecting a plurality of devices such as a processor 810, memory devices 812 for storage of information, diskette drives 814, a fixed disk drive 816, a monitor 818, other I/O devices 820, and a network interface card (NIC) 822. Processor 810 may be a microprocessor such as an Intel Pentium™ chip for processing applications. Memory devices 812 may include read-only memories (ROM) and/or random access memories (RAM). Diskette drives 814 may include a floppy drive and/or a compact disk (CD) drive. Fixed disk drive 816 may be a hard drive. I/O devices 820 may include a keyboard and/or a mouse for receiving input from a user of PC 804. Monitor 818 may display output from processor 810, and may also echo the input of the user. PC 804 may be connected to network path 806 through NIC 822.

A document management system may be installed on server 802. An individual desiring to access the document management system on server 802 may use an application loaded on PC 804, and may communicate with server 802 through NIC 822 and network path 806. In one aspect, the system for managing the flow of attachments consistent with an embodiment of the present invention may be stored in PC 804 and processor 810 of PC 804 may execute the software application locally within PC 804 and interface with one or more applications on server 802. Particularly, the software application may be stored on a floppy disk or a CD accessible by diskette drive 814 or on fixed disk drive 816. In another aspect, the software application consistent with an embodiment consistent with the present invention may be stored in server 802, which may execute the software application, and processor 810 of PC 804 may communicate with server 802 and retrieve the results of the execution of the software application from server 802.

Through the execution of the attachment flow software application consistent with an embodiment of the present invention, either locally within PC 804 or remotely within server 802, the flow of attachments between related business objects may be managed.

Alternatively, as shown in FIG. 9, a stand-alone PC 900 may be used for implementing a software application consistent with an embodiment of the present invention. PC 900 may include a bus line 902 connecting a plurality of devices, which may include a processor 904, memory devices 906 for storage of information, diskette drives 908, a fixed disk drive 910, a monitor 912, and other I/O devices 914. Processor 904 may be a microprocessor such as an Intel Pentium™ chip for processing applications. Memory devices 906 may include ROM and/or RAM. Diskette drives 908 may include a floppy drive and/or a compact disk (CD) drive. Fixed disk drive 910 may be a hard drive. Monitor 912 may display the output of processor 904 and may also echo the input of the user. I/O devices 914 may include a keyboard and/or a mouse for receiving input from a user of PC 900.

A software application consistent with an embodiment of the present invention may be stored on a floppy disk or a CD accessible by diskette drive 908 or on fixed disk drive 910. Processor 904 may execute the software application stored in the floppy disk the CD or the fixed disk drive 910. An individual, through monitor 912 and I/O devices 914, may interact with processor 904, which may execute the software application for entering required data.

Systems and or methods for managing the flow of attachments may be integrated into a web browser or software application, or may be installed as a plug-in to an existing browser or application. Systems consistent with the principles of the present invention may also be implemented into any transactional application utilizing frames. A software application implementing a system and/or method consistent with the principles of the present invention may be written in any number of programming languages, including but not limited to JavaScript, Visual Basic, Flash, C, C++, COBOL, and ABAP. Similarly, the present invention is not limited to use with certain applications, Internet browsers or operating systems.

Furthermore, systems and methods consistent with the principles of the present invention may be practiced in an electrical circuit comprising discrete electronic elements, packaged or integrated electronic chips containing logic gates, a circuit utilizing a microprocessor, or on a single chip containing electronic elements or microprocessors. The disclosed systems and methods may also be practiced using other technologies capable of performing logical operations such as, for example, AND, OR, and NOT, including but not limited to mechanical, optical, fluidic, and quantum technologies. In addition, the disclosed systems and methods may be practiced within a general purpose computer or in any other circuits or systems.

While certain features and embodiments consistent with the principles of the present invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the stages of the disclosed methods may be modified in any manner, including by reordering stages and/or inserting or deleting stages, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for managing the flow of documents comprising:
   applying an attribute to a first business object;
   assigning to a file containing unstructured content a plurality of document properties comprising a semantic property and at least one of (i) a business process role, (ii) a subset category, (iii) an access policy, and (iv) a document template;
   associating the file with the first business object, based on the semantic property associated with the file;
   applying the attribute to a second business object to relate it to the first business object;
   applying at least one pre-configured attachment flow rule to determine, without user intervention, whether, based on the attribute applied to the first and second business objects and at least one of the plurality of document properties, the file is relevant to the second business object; and
   associating the file with the second business object if the file is determined to be relevant to the second business object.

2. The method of claim 1, further comprising associating the file with the first business object by associating the file with a first attachment container associated with the first business object.

3. The method of claim 1, wherein the first business object is located outside a document management system in which the file is stored.

4. The method of claim 1, further comprising associating the file with the second business object by placing in an attachment container of the second business object one of the group consisting of (i) a link to the file; (ii) a copy of the file; (iii) a URL of the file; (iv) raw content of the file; and (v) meta-information of the file.

5. The method of claim 1, further comprising, in response to a command by a user to print the first business object, determining whether the file should be printed with the first business object.

6. The method of claim 1, further comprising determining whether a user authorized to access the second business object has security clearance to access the file.

7. The method of claim 1, further comprising allowing a user to manually associate a file associated with the first business object with the second business object.

8. The method of claim 7, further comprising preventing a user from manually associating a file having an unauthorized attachment type with the second business object.

9. The method of claim 1, further comprising determining whether the second business object has security authorization to be associated with the file associated with the first business object.

10. The method of claim 1 further comprising allowing a user to manually override the system to prevent a file associated with the first business object from being associated with the second business object.

11. The method of claim 1, further comprising notifying a user working in the first business object if the file has been associated with the second business object.

12. The method of claim 1, further comprising determining, in response to a command by a user to email the first business object, whether the file should be emailed with the first business object.

13. A system for managing the flow of documents comprising:
- a processor; and
- a memory containing instructions that when executed by the processor:
  - i. applies an attribute to a first business object;
  - ii. assigns to a file containing unstructured content at least one document property;
  - iii. associates the file with the first business object, based on the at least one document property;
  - iv. applies the attribute to a second business object to relate it to the first business object;
  - vi. applies at least one pre-configured attachment flow rule to determine whether, based on the attribute applied to the first and second business objects and the at least one document one property, the file is relevant to the second business object; and
  - vii. associates the file with the second business object, if the file is determined to be relevant to the second business object.

14. The system of claim 13, wherein the system may be integrated with a distributed object management system to manage the flow of files between boundaries of application systems.

15. The system of claim 13, wherein the system may be integrated with a message-oriented middleware system to manage the flow of files between boundaries of application systems.

16. The system of claim 13, wherein the system is operative to allow a system administrator to authorize which document types can be attached to a business object.

17. A tangible computer-readable storage medium comprising instructions that when executed by a processor performs a method comprising:
- a. applying an attribute to a first business object;
- b. assigning to a file containing unstructured content at least one document property;
- c. associating the file with the first business object, based on the at least one document property;
- d. applying the attribute to a second business object to relate it to the first business object;
- e. applying at least one pre-configured attachment flow rule to determine whether, based on the attribute applied to the first and second business objects and the at least one document property, the file is relevant to the second business object; and
- f. associating the file with the second business object if the file is determined to be relevant to the second business object.

18. The computer-readable storage medium of claim 17, further comprising associating the file with the first business object by associating the file with a first attachment container associated with the first business object.

19. The computer-readable storage medium of claim 17, wherein the first business object is located outside a document management system in which the file is stored.

20. The computer-readable storage medium of claim 17, further comprising associating the file with the second business object by placing in an attachment container of the second business object one of the group consisting of (i) a link to the file; (ii) a copy of the file; (iii) a URL of the file; (iv) raw content of the file; and (v) meta-information of the file.

* * * * *